(12) United States Patent
Maine

(10) Patent No.: US 6,226,855 B1
(45) Date of Patent: May 8, 2001

(54) METHOD OF JOINING LINED PIPES

(75) Inventor: Leslie Maine, Barrow upon Soar (GB)

(73) Assignee: Lattice Intellectual Property Ltd. (GB)

( * ) Notice: Subject to any disclaimer, the term of this patent is extended or adjusted under 35 U.S.C. 154(b) by 0 days.

(21) Appl. No.: 09/101,354
(22) PCT Filed: Nov. 3, 1997
(86) PCT No.: PCT/GB97/03022
 § 371 Date: Jun. 18, 1999
 § 102(e) Date: Jun. 18, 1999
(87) PCT Pub. No.: WO98/21513
 PCT Pub. Date: May 22, 1998

(30) Foreign Application Priority Data

Nov. 9, 1996 (GB) .................................................. 9623353

(51) Int. Cl.$^7$ ................................................. B21D 39/00
(52) U.S. Cl. ............................ 29/507; 285/55; 285/523; 228/44.5
(58) Field of Search ........................... 29/523, 522, 507; 156/165; 285/55, 258, 382.4; 228/44.5, 49.3, 50, 216

(56) References Cited

U.S. PATENT DOCUMENTS

| 2,216,839 | * | 10/1940 | Hoffman. | |
|---|---|---|---|---|
| 4,355,664 | | 10/1982 | Cook et al. . | |
| 4,432,824 | * | 2/1984 | Cook et al. | 156/165 |
| 4,708,375 | * | 11/1987 | Sauer | 285/258 |
| 5,348,211 | * | 9/1994 | White et al. | 228/120 |
| 5,992,897 | * | 11/1999 | Hill et al. | 285/55 |

FOREIGN PATENT DOCUMENTS

| 0366299 | * | 5/1990 | (GB) . |
|---|---|---|---|
| 0366299A2 | * | 5/1990 | (GB) . |

* cited by examiner

*Primary Examiner*—S. Thomas Hughes
*Assistant Examiner*—John C. Hong
(74) *Attorney, Agent, or Firm*—Larson & Taylor, PLC

(57) ABSTRACT

Two outer steel pipes (16 and 16A) are each lined by corrosion resistant lining pipes (18 and 18A) of compressible plastics material which stop short of the ends (20, 20A) of the outer pipes to leave an annular recess or counterbore (24 and 24A) at each of those ends. A tubular bridging-member (2) of ductile, plastically deformable, corrosion resistant material, for example brass or stainless steel has two tubular end portions (4 and 6) extending in opposite directions from an intermediate tubular portion (8) having an outer diameter greater than that of the end portions (4 and 6) and an inner diameter greater than that of the said end portions. The end portions (4 and 6) are encircled by ribs (12). Initially the outer diameter of the end portions (4, 6) is less than that of the inner diameter of the lining pipes (18, 18A). Thus each lined pipe (16, 16A) can be fitted over the respective end portions (4 and 6) with the intermediate portion (8) occupying the combined counterbore (24, 24A). A tool applied internally, radially expands the end portions (4 and 6) to compress the plastics lining pipes (18, 18A) against the outer pipes (16, 16A) by an amount in the range of 8% to 30% of the wall thickness of the lining pipes. Then adjacent ends (20, 20A) of the outer pipes are welded together at 28. The outer surface of the intermediate portion (8) can carry heat insulation material. The bridging-member (2) preserves the integrity of the internal corrosion resistance across the joint between the outer pipes.

10 Claims, 2 Drawing Sheets

METHOD OF JOINING LINED PIPES

This invention relates to a method of joining pipes lined with corrosion resistant plastics material.

Carbon steel pipelines are provided with liners of corrosion resistant plastics material so that the pipeline can be used to convey aggressive media. The provision of such liners avoids the need to use expensive stainless steel pipes.

An object of the invention is to provide a method capable of being used to provide a corrosion resistant barrier internally across a joint between two adjacent pipes each internally lined with corrosion resistant plastics material.

According to the invention a method of joining pipes lined with corrosion resistant plastics material comprises providing a first outer pipe lined by a first lining pipe of corrosion resistant compressible plastics material having an end face spaced internally of the first outer pipe from an end of said first lining pipe whereby said first outer pipe and said lining pipe combination has a first counterbore adjacent to said end of the first outer pipe, providing a tubular bridging-member of plastically deformable, corrosion resistant ductile material, said bridging-member comprising a tubular first end portion and an opposite tubular second end portion each extending in an opposite direction to the other from an intermediate tubular portion having an external diameter greater than that of the first or second tubular end portion and an internal diameter greater than that of first or second tubular end portions, introducing said first tubular end portion of the bridging-member into said first lining pipe and said intermediate portion into said first counterbore, providing a second outer pipe lined by a second lining gripe of corrosion resistant compressible plastics material having an end face spaced internally of the second outer pipe from an end of said second outer pipe whereby said second outer pipe and said second lining pipe combination has a second counterbore adjacent said end of the second outer pipe, introducing said second tubular end portion of the bridging-member into said second lining pipe and said intermediate portion into said second counterbore whereby said ends of the first and second outer pipes are adjacent, at a time after said first tubular end portion is introduced into said first lining pipe expanding the first tubular end portion transversely to its tube axis so as to press the first tubular end portion into the first lining pipe which is compressed between the first outer pipe and said first tubular end portion, at a time after said second tubular end portion is introduced into said second lining pipe expanding the second tubular end portion transversely to its tube axis so as to press the second tubular end portion into the second lining pipe which is compressed between said second outer pipe and said second tubular end portion, and at a time after said ends of the first and second outer pipes are brought into adjacency said outer pipes being joined together externally of said lining pipes.

Each outer pipe may be of metal, for example a ferrous metal. The ferrous metal may be steel, for example carbon steel.

Each lining pipe may formed of thermoplastic plastics material.

Each lining pipe may be formed of a polyolefin, or a polyethylene, or a polyvinylidene fluoride.

A said lining pipe may be inserted into a said outer pipe by first compressing the outer diameter of the lining pipe, then drawing the lining pipe into the outer pipe and allowing the lining pipe to resile or re-expand to substantially its original external diameter so as to fit relatively closely against the inner wall of the outer pipe.

The bridging-member may be formed of a corrosion resistant metal, for example brass or stainless steel.

The invention will now be further described, by way of example; with reference to the accompanying drawings in which.

Figure 1:
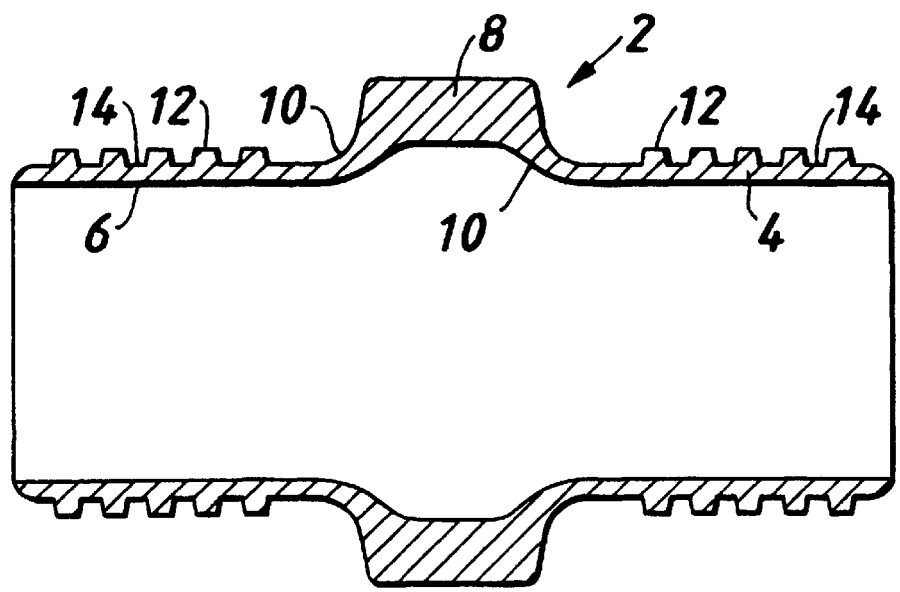
FIG. 1 is a cross-section of a bridging-member used in the method according to the invention.

In FIG. 1 a bridging-member 2 is formed of plastically deformable, ductile material of good corrosion resistance and capable of withstanding permanent plastic strains of, for example, 3%. The bridging-member 2 may be corrosion resistant metal, for example brass or stainless steel. The bridging-member 2 is of an open ended tubular form having substantially cylindrical tubular end portions 4 and 6 extending in opposite directions from an intermediate or central tubular portion 8 which in cross-section is rather like a humped-back bridge. Each end portion 4, 6 curves, flares or blends at 10 into the central portion 8 which has an internal diameter greater than that of the tubular end portions 4, 6 and an outer diameter greater than that of said tubular end portions 4, 6. Each tubular end portion 4, 6 has on its outer surface a plurality of integral excrescences 12 axially spaced apart by flat bottomed groves 14. The excrescences 12 may each be of a substantially castellated cross-sectional shape and may have sloping sides and rounded top corners, and each excresence is preferably in the form of a continuous annular rib extending around the respective end portion 4 or 6.

Figure 2:
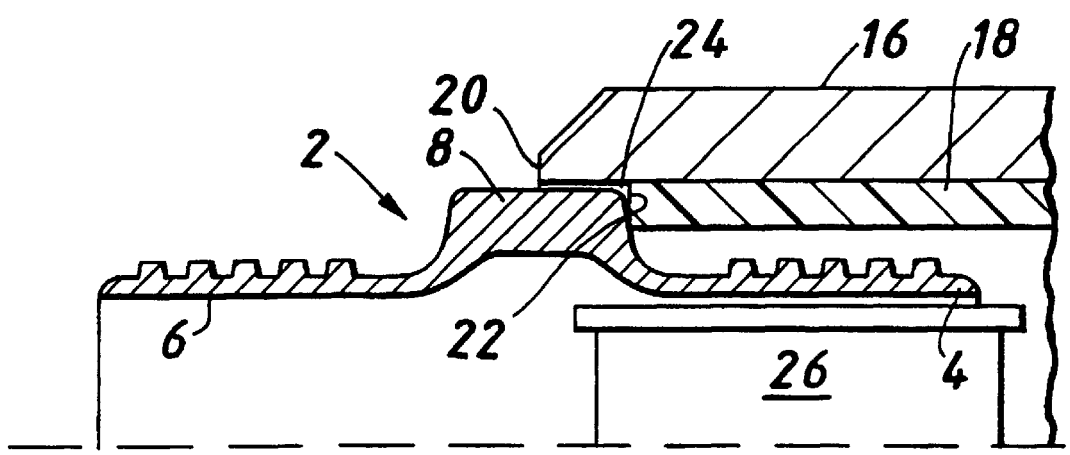
FIG. 2 is a cross-section to illustrate a stage in the method according to invention using the bridging-member in FIG. 1.

With reference to FIG. 2 an outer pipe 16 is formed of metal, preferably a weldable metal, for example cast steel. The pipe 16 is lined with a lining pipe 18 of corrosion resistant plastics material, for example polyethylene, installed in the pipe 16 by any suitable known means. The lining pipe 18 may have any desired length, for example it may be about twenty four meters in length. The outer pipe 16 has an end 20. The lining pipe 18 is so formed that it has an end face 22 spaced axially back internally of the outer pipe 16 so that the pipe combinations 16, 18 has an annular recess or counterbore 24 at the end 20 of the pipe combination. The counterbore 24 may result from inserting the lining pipe 18 into the pipe 16 so the lining pipe is spaced from the pipe end 20, or the installed lining pipe may be cut back from the pipe end 20 to form a counterbore 24 of desired size.

The tubular end portion 4 of the bridging-member 2 is inserted into the lining pipe 18 through pipe end 20 so that substantially half the axial length of the central tubular portion 8 occupies the counterbore 24, and the end face 22 and central portion 8 are in abutement. Now a radially expansible tool 26 of any suitable known kind which may be operated hydraulically or mechanically is inserted into the tubular end portion 4.

Figure 3:
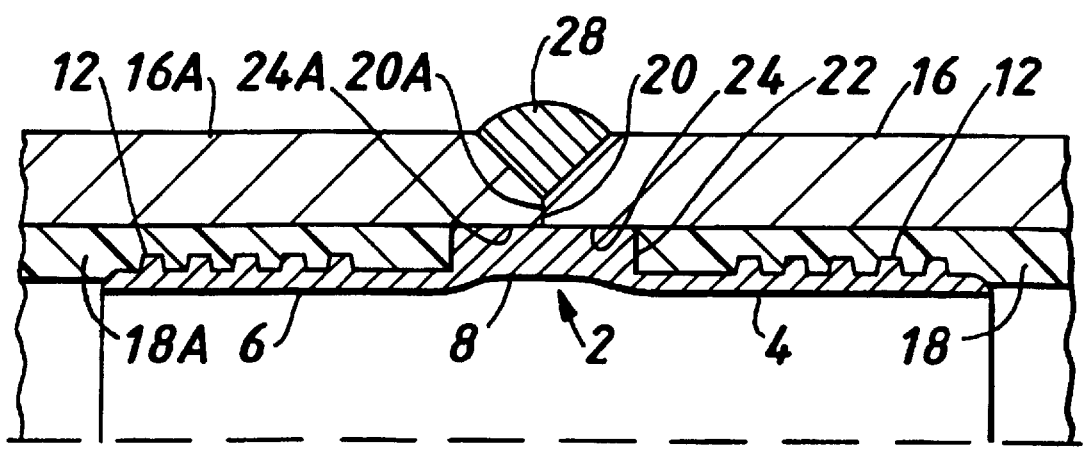
FIG. 3 is a cross-section to illustrate two outer pipes and their linings joined by the method according to invention in which the bridging-member in FIG. 1 is used.

In FIG. 2 the tool 26 is expanded to radially expand the tubular end portion 4 thereby expanding the outer diameter of the tubular end portion 4 causing the tubular end portion 4 of the bridging-member 2 to become embedded into the inner surface of the lining pipe 18 and compress the lining pipe against the outer pipe 16 (see FIG. 3). The radial expansion of the tubular end portion 4 has the effect of bracing the central portion 8 of the bridging-member 2 against the inner surface of the outer pipe 16.

Now, continuing with FIG. 3, another outer pipe 16A with its plastics lining 18A and counterbore 24A at pipe end 20A is fitted over the tubular end portion 6 and other half of the central portion 8 of the bridging-member 2, and the expansible tool 26 (FIG. 2) is used to radially expand the tubular end portion 6 against and into the lining pipe 18A. Then the two adjacent pipe ends 20, 20 of the outer pipes can be welded together in an annular weld joint 28.

If desired, the pipes 16, 16A may be welded together before the end portions 4 and 6 are radially expanded. Those end portions 4 and 6 may be radially expanded in any order before or after the welding, or may be expanded simultaneously. The expanding tool 26 may also serve as a guide or former for aligning the pipes 16 and 16A prior to welding.

The wall thickness of each lining pipe 18, 18A may be compressed by any desired amount, though the preferred range is a compression of between 8% to 30%. The bridging-member 2 is capable of being used with a typical range of lined pipe tolerances by reason of controlling the force applied by the tool 26 rather than by varying the extent of its radial expansion.

The bridging-member 2 preserves the integrity of the anti-corrosion interior of the joined pipes 16 and 16A by extending internally across the joint between those two pipes and being in substantially fluid-tight relation with the lining pipes 18 and 18A.

If desired the intermediate portion 8 of the bridging-member 2 may be surrounded externally by heat insulating material to impede the passage of heat from the pipe joint welding process into the plastics pipes 18 and 18A which may be damaged by the welding heat.

Figure 4:
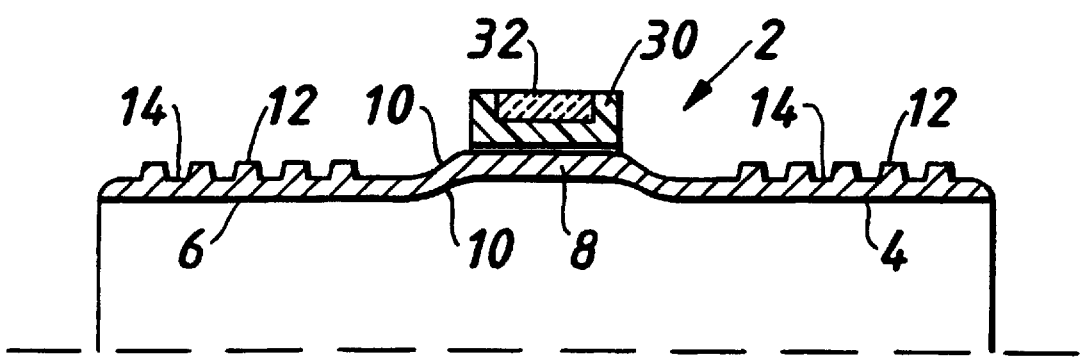
FIG. 4 is a cross-section of another embodiment of the bridging-member for use in the method according to the invention.

In FIG. 4 the bridging-member 2 has an intermediate portion 8 of reduced wall thickness compared with that in FIG. 1. The intermediate portion 8 in FIG. 4 is surrounded by a ring 30 of plastics material carrying on its outer side a ring of heat insulating material 32. The rings 30, 32 may be attached to the intermediate portion 8, for example by adhesive. Or the ring 30 with the heat insulation 32 may be placed about the intermediate portion 8 after one of the tubular end portion 4 or 6 has been inserted into one of the lining pipes 18 or 18A.

What is claimed is:

1. A method of joining pipes lined with corrosion resistant plastics material comprising:

providing a first outer pipe lined by a first lining pipe of corrosion resistant compressible plastics material having an end face spaced internally of the first outer pipe from an end of said first outer pipe whereby said first outer pipe and said first lining pipe combination has a first counterbore adjacent to said end of the first outer pipe;

providing a tubular bridging-member of plastically deformable, corrosion resistant ductile material, said bridging-member comprising a tubular first end portion and an opposite tubular second end portion each extending in an opposite direction to the other from an intermediate tubular portion having an external diameter greater than that of the first tubular end portion or second tubular end portion and an internal diameter greater than that of first tubular end portion or second tubular end portion;

introducing said first tubular end portion of the bridging-member into said first lining pipe and said intermediate portion into said first counterbore;

providing a second outer pipe lined by a second lining pipe of corrosion resistant compressible plastics material having an end face spaced internally of the second outer pipe from an end of said second outer pipe whereby said second outer pipe and said second lining pipe combination has a second counterbore adjacent said end of the second outer pipe; and introducing said second tubular end portion of the bridging-member into said second lining pipe and introducing said intermediate portion into said second counterbore, whereby said ends of the first and second pipes are adjacent, at a time after said first tubular end portion is introduced into said first lining pipe expanding the first tubular end portion transversely to its tube axis so as to press the first tubular end portion into the first lining pipe which is compressed between the first outer pipe and said first tubular end portion, at a time after said second tubular end portion is introduced into said second lining pipe expanding the second tubular end portion, transversely to its axis so as to press the second tubular end portion into the second lining pipe which is compressed between said second outer pipe and said second tubular end portion, and at a time after said ends of the first and second outer pipes are brought into adjacency said outer pipes being joined together externally of said lining pipes.

2. A method as claimed in claim 1, wherein each of said tubular end portions carries external excrescences.

3. A method as claimed in claim 2, wherein said excrescences comprise a plurality of axially spaced annular ribs.

4. A method as claimed in claim 1, wherein the bridging-member comprises metal.

5. A method as claimed in claim 4, wherein the metal comprises brass or stainless steel.

6. A method as claimed in claim 1, wherein the intermediate tubular portion of the bridging-member is surrounded by heat insulation material.

7. A method as claimed in claim 6, further comprising placing the heat insulation material around the intermediate tubular portion after the first tubular end portion of the bridging-member is introduced into the first lining pipe.

8. A method as claimed in claim 6 wherein the heat insulation material is provided at an outer side of a ring.

9. A method as claimed in claim 1, wherein the intermediate tubular portion of the bridging-member includes a side face which can come into abutment with one of said end faces.

10. A method as claimed in claim 1, wherein the outer pipes comprise a weldable material and are joined together by welding.

* * * * *